June 27, 1939.   B. E. HOUSE   2,163,879
BRAKE
Filed May 24, 1929
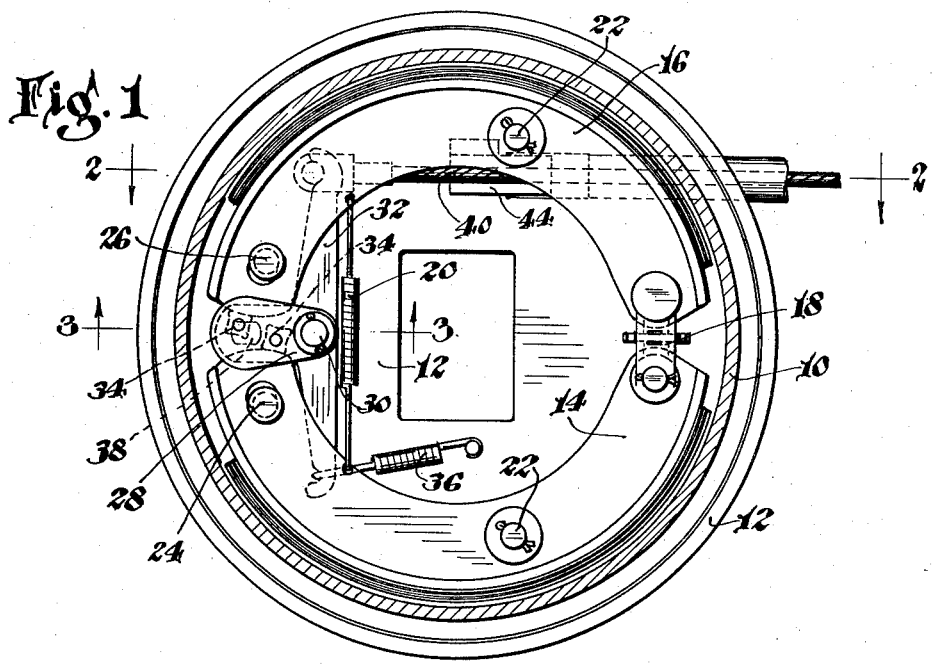
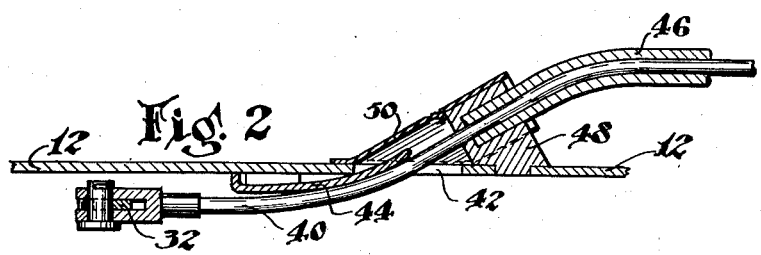
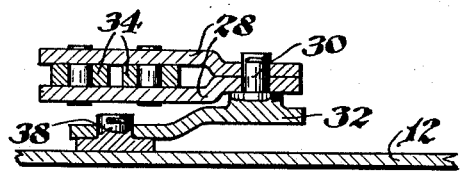
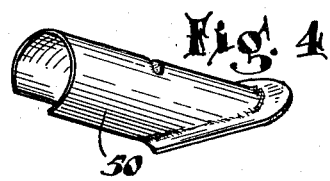
INVENTOR
Bryan E. House
BY
M. W. McConkey
ATTORNEY Patented June 27, 1939

2,163,879

UNITED STATES PATENT OFFICE 2,163,879

BRAKE

Bryan E. House, South Bend, Ind., assignor to Bendix Brake Company, South Bend, Ind., a corporation of Illinois Application May 24, 1929, Serial No. 365,596

21 Claims. (Cl. 188—78)

This invention relates to brakes, and is illustrated as embodied in an internal expanding automobile brake. An object of the invention is to provide simplified operating means for the brake, preferably including a Bowden or other cable or tension element passing through the brake backing plate. Various features of novelty relate to the construction and mounting of a novel operating lever to which the brake cam lever is pivoted, to the arrangement of the parts to facilitate the passage of the operating cable through the backing plate, and to other novel arrangements and constructions which will be apparent from the following description of the illustrative embodiment shown in the accompanying drawing, in which:

Figure 1 is a vertical section through the brake, just inside the head of the brake drum, and showing the brake shoes in side elevation;

Figure 2 is a partial section on the line 2—2 of Figure 1, showing the cable arrangement;

Figure 3 is a section through the brake cam lever, on the line 3—3 of Figure 1; and Figure 4 is a perspective of the closure stamping covering the opening through which the cable passes.

Figure 5 is a perspective view of a thrust block.

The illustrated brake includes a rotatable drum 10, at the open side of which is a support such as a backing plate 12, and within which are the brake shoes 14 and 16 or their equivalents. The shoes are connected by an expansible pivot joint 18, serving as a wear adjustment for the brake, and are provided with the usual return spring 20 and with suitable steady rests 22, etc. If the drum is turning clockwise when the brake is applied, shoe 14 anchors against a fixed post 24, while if the drum is turning counter-clockwise the shoe 16 anchors against a fixed post 26.

The particular brake illustrated is intended to be mounted on the front wheel of an automobile. This type of brake is more fully described, and various features of the brake assembly are claimed, in prior application No. 304,196, owned by the assignee of the present application.

According to the present invention, the brake is applied by means such as a floating cam lever including two stampings 28 engaging each other at one end and mounted at that end on a pivot 30 carried by a novel operating lever 32, and spread apart to provide parallel spaced portions in the body of the lever, between which are pivotally mounted a pair of generally-square thrust blocks 34, the sides of which are slightly concaved to fit the rounded ends of shoes 14 and 16.

The novel operating lever 32 is of the bellcrank type, having three arms, the lowest one being connected to a return spring 36, the central one being mounted on a pivot 38 carried by the backing plate opposite the free end of the cam lever 28, and the uppermost one being connected to a steel Bowden cable or equivalent tension element 40. Thus tension on the cable 40 rocks the cam lever 28 to apply the brake, while at the same time the cam lever 28 can shift about pivot 30 to balance the pressures on the two shoes, and to permit the shifting of the anchorage from post 24 to post 26.

Cable 40 forms part of a novel Bowden-type operating mechanism, and has a section inclined at an acute angle to the plane of the backing plate and passing through an opening 42 in the backing plate, this section sliding in engagement with a wedge-surfaced guide part or ramp 44 secured to the inner face of the backing plate and having a portion projecting through the opening 42. The part of the cable 40 outside the backing plate is housed in a flexible Bowden-type housing or conduit 46, for example of the construction disclosed in copending Rosner application No. 346,065, and which conduit is attached to a fitting 48 carried by the backing plate.

The opening 42 is preferably closed by means such as the steel stamping 50 shown in Figure 4, and which has a flanged base seated against the backing plate, and a cable-encircling tubular portion extending at an acute angle to the base.

While one illustrative embodiment has been described in detail, it is not my intention to limit the scope of the invention to that particular embodiment, or otherwise than by the terms of the appended claims.

I claim:

1. A brake-applying device comprising a three-arm lever pivoted at the end of one arm and having a return spring acting on the second arm and having applying means acting on the third arm, in combination with a floating cam lever pivoted at its end thereto.

2. A brake-applying device comprising a three-arm lever pivoted at the end of one arm and having a return spring acting on the second arm and having applying means acting on the third arm, in combination with a floating cam lever pivoted at its end thereto adjacent the common portion connecting said three arms.

3. A brake-applying device comprising a three-arm lever pivoted at the end of one arm and having a return spring acting on the second arm and having applying means acting on the third arm, in combination with a floating cam lever having spaced thrust blocks and pivoted at its end to the three-arm lever.

4. A three-arm lever for a brake-applying device adapted to support a cam lever at its center, and having one arm adapted to be pivotally-mounted at its end, and having its second arm adapted to be connected to a return spring, and having its third arm adapted to be connected to brake-applying means.

5. A brake-applying device comprising, in combination, a fixed fulcrum pivot, a lever pivoted thereon intermediate its ends, an operating element connected directly to one end of said lever, and a floating cam lever pivoted at its end to the first lever some distance from its fulcrum pivot and including spaced portions having a pair of thrust parts mounted between them.

6. A brake-applying device comprising, in combination, a fixed fulcrum pivot, a lever pivoted thereon intermediate its ends, an operating element connected directly to one end of said lever, and a floating cam lever pivoted at its end to the first lever some distance from its fulcrum pivot and including spaced portions having a pair of thrust blocks pivotally mounted between them.

7. A brake comprising a backing plate, friction means mounted on said plate and having adjacent separable ends, a lever pivoted intermediate its ends adjacent said separable ends and having its operating end extending between the friction means and the plate, an applying device operatively engaged by the lever and operatively engaging said separable ends, a conduit outside the backing plate and opening at its end through the backing plate, and a cable passing through the backing plate and connected to the end of said lever.

8. A brake comprising a backing plate, a pair of adjustably connected shoes mounted on said plate and having adjacent unconnected separable ends, anchorage means adjacent said separable ends, a lever pivoted intermediate its ends adjacent said anchorage means and having its operating end extending between one of the shoes and the plate, an applying device operatively engaged by the lever and operatively engaging said separable ends, a conduit outside the backing plate and opening at its end through the backing plate, and a cable passing through the backing plate and connected to the end of said lever.

9. A brake comprising a backing plate, friction means mounted on said plate and having adjacent separable ends, anchorage means on which one or the other of said ends is adapted to anchor, a lever pivoted intermediate its ends adjacent said separable ends and having its operating end extending between the friction means and the plate, an applying device operatively engaged by the lever and operatively engaging said separable ends, a conduit outside the backing plate and opening at its end through the backing plate, and a cable passing through the backing plate and connected to the end of said lever.

10. A brake comprising a drum and a backing plate, friction means within the drum having its ends at the side of the brake substantially at the normally-horizontal radius of the drum, an applying lever operatively associated with said ends and extending along a vertical chord of the drum perpendicular to said radius and just inside said ends, a return spring acting on a part of said lever below said ends, and a horizontal rearwardly extending tension device connected to the upper end of the lever and extending approximately perpendicular to said lever and passing through the backing plate and forming one element of a Bowden control outside of the backing plate.

11. A brake comprising a drum and a backing plate, friction means within the drum having its ends at the side of the brake substantially at the normally-horizontal radius of the drum, an applying lever operatively associated with said ends and having an operating portion extending along a vertical chord of the drum perpendicular to said radius and just inside said ends, and a horizontal rearwardly extending tension device connected to the upper end of the operating portion of the lever and extending approximately perpendicular to said lever and passing through the backing plate and forming one element of a Bowden control outside of the backing plate.

12. A brake-applying device comprising a three arm lever pivoted at the end of one arm and having a return spring action on the second arm and having applying means acting on the third arm, in combination with a floating cam lever pivoted at its end to said first named lever at the junction of said three arms.

13. A brake drum and a backing plate having friction means mounted thereon, said friction means anchoring at one end when the drum rotates in one direction and at the other end when the drum rotates in the other direction, and provided with an applying lever inside the drum, pivotally mounted intermediate its ends and having an operating portion extending along a chord of the drum perpendicular to that radius of the drum which extends between the ends of the friction means, in combination with a tension element substantially paralleling said radius and extending along a chord of the drum substantially perpendicular to said first chord and passing through the backing plate and connected to the operating portion of said lever, and a Bowden conduit connected at its end to said backing plate and enclosing the portion of the tension element which is outside of the backing plate, said operating lever energizing the friction means through a cam lever extending between the ends of the friction means and pivoted to the operating lever.

14. A brake comprising a backing plate, a brake drum, friction means mounted on said plate and having adjacent separable ends, said friction means anchoring at one end when the drum rotates in one direction and at the other end when the drum rotates in the other direction, a lever pivoted intermediate its ends adjacent said separable ends and having its operating end extending between the friction means and the plate, an applying device operatively engaged by the lever and operatively engaging said separable ends and following the motion of these ends as the anchorage of the friction means changes, a conduit outside the backing plate and opening at its end through the backing plate, and a cable passing through the backing plate and connected to the end of said lever.

15. A brake comprising an operating lever including an elongated member of flat metal having hooks in the plane of the flat member at both ends and having cam means arranged centrally thereof.

16. A brake comprising a fixed support, a rotatable drum associated with the support, friction elements on the support for cooperation with the drum, operating lever means having parts acting on and arranged between the separable ends of the friction element, having an operating arm and having a second arm extending beyond the fulcrum of the lever, a return spring tensioned between one of said arms and the fixed support, a flexible conduit secured to the exterior of the fixed support and opening at its end therethrough, and a flexible tension element extending through the conduit and through the fixed support and attached to the other of said arms.

17. In a brake, a drum, a brake shoe engageable therewith and having separable ends, a lever means having a part engaging said ends and movable relative thereto for separating the same, said lever means being provided with an end portion, an operating cable extending into the drum, a yoke connected to the cable and straddling the end portion of said lever means, and a pin bridging the arms of said yoke and engaging the surface of said end portion.

18. In a brake, a drum, a brake shoe engageable therewith and having separable ends, anchorage means for said ends, a lever for separating the same, a second lever fulcrumed between said ends and engaging the lever at one side of the anchorage means for operating the lever and the other end of said second mentioned lever extending beyond the anchorage means and having spring means connected to said other end for returning the second lever to normal position.

19. In a brake mechanism, a drum, a self-energizing brake shoe engageable therewith and having separable ends, a lever for thrusting the ends of the shoe apart and into engagement with the drum upon movement of the lever about its fulcrum, operating means for said lever, a connection between said lever and operating means, and spring means directly engaging the operating means and serving with said connection to eliminate any involuntary movement of the operating means caused by the involuntary movement of the lever due to the movement of the shoe in settling upon the completion of a brake application.

20. In a brake mechanism, a drum, a full floating self-energizing brake shoe engageable therewith and having separable ends, a lever for thrusting the ends of the shoe apart and into engagement with the drum upon movement of the lever about its fulcrum, operating means for said lever, a connection between said lever and operating means in combination with spring means directly engaging said operating means and serving to eliminate any involuntary movement of the operating means caused by the involuntary movements of the lever.

21. A brake comprising a backing plate having friction means mounted thereon, said friction means having adjacent separable ends, a lever pivoted intermediate its ends to the backing plate adjacent said separable ends and extending between the friction means and said plate, an applying device pivoted to the lever intermediate the ends of the latter and operatively engaging the separable ends, and means connected with one end of the lever to rock the latter for operating said device.

BRYAN E. HOUSE.